United States Patent Office 3,743,509
Patented July 3, 1973

3,743,509
o-AMINOMETHYL-p-PHENYLENEDIAMINES AND
DIAZONIUM SALTS THEREOF
Evan S. Baltazzi, Brookfield, and Helen C. Printy, Palatine, Ill., assignors to Addressograph-Multigraph Corporation, Mount Prospect, Ill.
No Drawing. Continuation-in-part of application Ser. No. 627,300, Mar. 31, 1967. This application July 20, 1970, Ser. 56,720
Int. Cl. C07c 113/04; G03c 7/54
U.S. Cl. 96—91 R    7 Claims

ABSTRACT OF THE DISCLOSURE

Amines, and corresponding diazonium salts which are useful in unusually fast light-sensitive diazotype copying sheets, having the general formula

[Structure: benzene ring with A at top, B at upper right, CH$_2$—Am at right, NH$_2$ at bottom]

wherein A is hydrogen, hydroxyl, alkoxyl, halo, or alkoxyalkoxyl; B is a tertiary amino radical containing from 2 to 8 carbon atoms, either cyclic, such as morpholino, hexamethylenimino, azabicyclononyl, pyrrolidino, piperidino or dialkyl substituted; and Am is a tertiary amino radical such as a dialkylamino, alkylarylamino, alkylcycloalkyl, or one of the radicals represented by B.

This application is a continuation-in-part of copending U.S. application Ser. No. 627,300, filed Mar. 31, 1967 now abandoned, and assigned to the same assignee as the instant application.

BRIEF SUMMARY OF THE INVENTION

The invention comprises (a) diazonium salts, particularly double salts with zinc chloride, derived from the amines described in the abstract, (b) diazotype sheet materials coated with said diazonium salts of said amines being prepared from the corresponding benzamides of the formula:

[Structure: benzene ring with A at top, B at upper right, CO—Am at right, NH$_2$ at bottom]

wherein A, B and Am have the meanings given in the abstract. The diazonium salts are useful in two-component light-sensitive coatings for diazotype sheet materials which are unusually fast to visible light and are valuable in photocopying procedures.

DETAILED DESCRIPTION OF THE INVENTION

This invention relates to o-aminomethyl-p-phenylenediamines which can be diazotized to yield light-sensitive diazonium salts, to diazonium salts so produced, and to the method of preparing the same.

The amines of this invention can be illustrated by the following structural formulas

[Structure: benzene ring with A at top, B at upper right, CH$_2$NR$_1$R$_2$ at right, NH$_2$ at bottom]

and

[Structure: benzene ring with A at top, B at upper right, CH$_2$—N(C-/C-) cyclic at right, NH$_2$ at bottom]

wherein A represents hydrogen, alkoxyl containing 1 to 4 carbon atoms, hydroxyl, chlorine or alkoxyalkoxyl containing 2 to 8 carbon atoms; B is morpholino, hexamethyleneimino, azabicyclononyl, pyrrolidino, piperidino or a dialkylamino containing 2 to 8 carbon atoms; R$_1$ is lower alkyl containing 1 to 4 carbon atoms, phenyl, cycloalkyl or benzyl, and R$_2$ is lower alkyl containing 1 to 4 carbon atoms, phenyl, cycloalkyl or benzyl, the sum of the carbon atoms in R$_1$ and R$_2$ being from 2 to 14 inclusive, and

[Structure: —N(C-/C-) cyclic]

is a saturated cyclic amino radical containing 4 to 10 carbon atoms, inclusive, derived from pyrrolidine, piperidine, lower alkyl-substituted piperidine, hexamethylenimine, azabicyclononane, and morpholine.

It is an object of this invention to provide new substtiuted o-aminobenzylamines which are useful in the production of fast, light-sensitive diazonium salts. It is a further object to provide new diazonium salts useful in light-sensitive diazotype materials, particularly in two-component diazotype coatings of unusual sensitivity to visible light. Another object is to provide efficient methods for the production of such substituted o-aminobenzylamines and light-sensitive diazonium salts. These and other objects are apparent from and achieved in accordance with the following detailed disclosure.

In the compounds of the foregoing formulas, A can represent alkoxyl groups such as methoxyl, ethoxyl, propoxyl, butoxyl, and pentoxyl. Substituted alkoxyl groups are also suitable, such as ethoxyethoxyl and phenoxyethoxyl. Halogens such as chlorine are also represented by A.

The secondary amino radical represented by B can be dialkylamino radical such as dimethylamino, dipropylamino, methylethylamino, methylpentylamino, ethylbutylamino, and similar secondary alkyl-aryl amino radicals containing 2 to 12 carbon atoms, such as methylbenzylamino, ethylbenzylamino, methylphenethylamino, and dibenzylamino. Heterocyclic amino radicals such as pyrrolidino, piperidino, morpholino, hexamethylenimino, piperazino, and alkylated derivatives thereof can also form the secondary amino radical B. A preferred B radical can be represented as

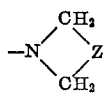

wherein Z is $CH_2$, $C_2H_4$, $C_3H_6$, $C_4H_8$, $C_6H_8$ or a similar bivalent hydrocarbon radical containing two to six carbon atoms.

The radical $R_1$ can be an alkyl radical containing 1 to 5 carbon atoms, inclusive, a cycloalkyl radical such as cyclopropyl, cyclobutyl, cyclopentyl, cyclohexyl, cycloheptyl and cyclooctyl or an aryl or aralkyl such as phenyl or phenylmethyl, phenylbutyl, and phenylpropyl.

The radical $R_2$ represents alkyl, cycloalkyl, aryl or aralkyl radicals of the type described above.

The amines of the present invention can be diazotized by conventional techniques to yield stable light-sensitive diazonium salts suitable in light-sensitive coatings that may be applied to substrates such as paper, cloth or film to form light-sensitive diazotype materials. The diazonium salts are soluble in water, and a spectral analysis of these materials exhibits peak absorptions in the range of 400 to 450 millimicrons. In this range of spectral sensitivity the diazotype materials derived from the amines of this invention can be processed much faster on existing diazo copying equipment and have lead to simplified copying apparatus equipped with less expensive energy sources such as fluorescent and incandescent light sources. When exposed to fluorescent light, the diazo compounds of the amines of this invention are two to five times as fast as the fast diazo compounds of Werner et al. Pat. No. 3,028,240, Apr. 3, 1962.

The amines of this invention can be prepared by reacting a 2-nitro-4-substituted-5-halobenzoyl halide with a secondary alkyl, aryl, aralkyl, or alicyclic amine to yield a 2-nitro-4-substituted-5-halobenzamide, which is then reacted with a secondary amine to produce an aminonitrobenzamide which can be reduced to the corresponding diaminobenzamide, as disclosed in the Baltazzi application Ser. No. 514,130, filed Dec. 15, 1965, now U.S. Pat. No. 3,463,639. The carbonyl radical of the benzamide moiety can then be reduced to methylene by treatment with diborane in an inert solvent. The substituent in the 4-position of the starting benzoyl halide corresponds to the radical A described above. The procedure can be illustrated by the following reaction diagram.

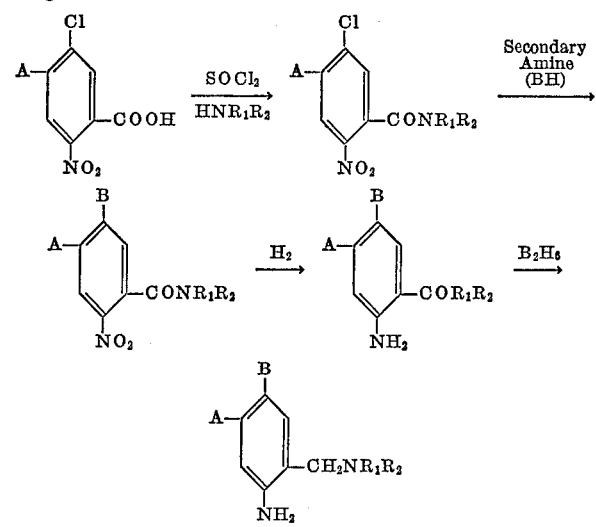

Referring to the reaction diagram, the secondary amine (BH) can be a compound having from 2 to 12 carbon atoms which is cyclic or acyclic chain.

Typical compounds prepared by the process of this invention include:

2-(N-ethyl-N-phenylaminomethyl)-4-morpholinoaniline
2-(N,N-di-sec-butylaminomethyl)-4-morpholino-5-methoxyaniline
2-(N-ethyl-N-phenylaminomethyl)-4-pyrrolidine-5-methoxyaniline
2-(N-morpholinomethyl)-4-morpholino-5-methoxyaniline
2-(N-benzyl-N-isopropylaminomethyl)-4-piperidino-5-methoxyaniline
2-(N-ethyl-N-phenylaminomethyl)-4-N-azobicyclononyl-5-chloroaniline
2-(N,N-di-n-butylaminomethyl)-4-morpholino-5-methoxyaniline
2-(N-ethyl-N-phenylaminomethyl)-4-pyrrolidine-5-methoxyaniline
2-[N-(2,6-dimethylpiperidine)methyl]-4-hexamethylenimino-5-methoxyaniline
2-(N,N-benzylisopropylaminomethyl)-4-pyrrolidino-5-methoxyaniline
2-(N,N-diisobutylaminomethyl)-4-morpholino-5-butoxyaniline
2-(N,N-diisopropyl-N-benzylaminomethyl)-4-morpholino-5-hydroxyaniline
2-(N-isopropyl-N-benzylaminomethyl)-4-morpholino-5-acetoxyaniline
2-(N-isopropyl-N-benzylaminomethyl)-4-morpholino-5-ethoxyaniline
2-(N-ethyl-N-phenylaminomethyl)-4-morpholino-5-phenoxethoxyaniline
2-(N-sec.-butyl-N-phenylaminomethyl)-4-hexamethyleneimino-5-chloroaniline
2-(N,N-diisobutylaminomethyl)-4-piperidino-5-chloroaniline
2- N,N-di-n-butylamino-methyl)-4-hexamethylimino-5-methoxyaniline
2-(N-azobicyclononyl-methyl)-4-morpholino-5-methoxyaniline
2-(N-hexamethylimino-methyl)-4-piperidino-5-methoxyaniline
2-(N-piperidinomethyl)-4-pyrrolidino-5-methoxyaniline
2-(N-pyrrolidinomethyl)-4-pyrrolidino-5-methoxyaniline
2-[N-(4-methylpiperidino)methyl]-4-pyrrolidino-5-methoxyaniline
2-(N,N-dicyclohexylamino-methyl)-4-hexamethylimino-5-methoxyaniline
2-(N,N-diphenylaminomethyl)-4-pyrrolidino-5-methoxyaniline
2-(N-morpholinomethyl)-4-morpholino-5-phenoxyethoxyaniline
2-(N-benzyl-N-methylaminomethyl)-4-piperidino-5-chloroaniline
2-(N-ethyl-N-phenylaminomethyl)-4-morpholino-5-hydroxyaniline
2-(N-pyrrolidinomethyl)-4-morpholino-5-ethoxyethoxyaniline
2-(N-hexamethyleneiminomethyl)-4-morpholino-5-butoxyaniline
2-(N-cyclohexyl-N-isopropylamino-methyl)-4-azobicyclononylaniline The invention is further disclosed by the following examples which are illustrative thereof.

Example 1

Preparation of 2-(N-ethyl-N-phenylaminomethyl) - 4-morpholinoaniline.—100 grams (0.5 mole) of 2-nitro-5-chlorobenzoic acid (prepared by the oxidation of 2-nitro - 5 - chlorotoluene) was added to a mixture of 200 ml. of benzene and 200 ml. of thionyl chloride and the reaction mixture heated under reflux for 2 hours. The solution was evaporated and the residue was dissolved in methylene chloride (250 ml.), and cooled to 0° C. To this solution, maintained between 10°–15° C., was added with stirring over a 10-minute period a solution of ethylaniline (150 g.) in methylene chloride (110 ml.). The solution was further stirred while at room temperature for 30 minutes. The solution was then washed with dilute hydrochloric acid and twice with water. The solution was evaporated, leaving a residue of N-ethyl - N - (2-nitro - 5 - chlorobenzoyl)-aniline which was recrystallized from petroleum ether; M.P. 149–151° C.

The N-ethyl-N-(2-nitro-5-chlorobenzoyl)-aniline (100 g.) was added to morpholine (1 liter) and the solution heated at 90° C. for 18 hours, then was concentrated under reduced pressure and the residue dissolved in methylene chloride, washed wth dilute hydrochloric acid and twice with water. The solution was evaporated to a residue of N-ethyl-N-(2 - nitro-5-morpholinobenzoyl)-aniline which was recrystallized from petroleum ether; M.P. 186°–188° C.

The N-ethyl-N-(2-nitro-5-morpholinobenzoyl) - aniline (50 g.) was dissolved in isopropyl alcohol (400 ml.) and the solution reduced on a Parr hydrogenation apparatus at 3–4 atmospheres in the presence of Raney nickel until hydrogen uptake ceased. The mixture was filtered to remove the catalyst the filtrate concentrated to a residue of N-ethyl-N-(2-amino-5-morpholinobenzoyl) - aniline. It was recrystallized from petroleum ether; M.P. 109–111° C.

A solution of 9.75 g. (0.03 mole) of N-ethyl-N-(2-amino-5-morpholinobenzoyl)-aniline in 100 ml. of tetrahydrofuran was added to 100 ml. of a cooled (0° C.) solution of 1 N borane in tetrahydrofuran. The reaction was stirred at 25° C. for 30 minutes, then refluxed for 3 hours. The excess borane was carefully decomposed with 6 N hydrochloric acid, the mixture concentrated to low volume, basified with 10% sodium hydroxide, and the product extracted with methylene chloride. The 2-(N-ethyl-N-phenylaminoethyl)-4-morpholinoaniline was crystallized from petroleum ether; M.P. 72°–75° C.

Example 2

Preparation of 2-(N,N-di-sec.-butylaminomethyl) - 4-morpholino-5-methoxyaniline.—Treatment of 2-amino-4-methoxy-5-morpholinobenzoyl-di-sec.-butylamine with diborane as described in Example 1 afforded 2-(N,N-di-sec.-butylaminomethyl)-4-morpholino-5-methoxyaniline.

Example 3

Preparation of 2-(N-ethyl-N-phenylaminomethyl) - 4-pyrrolidino-5-methoxyaniline.—Reduction of N-ethyl - 2-amino-4-methoxy-5 - pyrrolidinobenzanilide in benzene-tetrahydrofuran with diborane gave 2-(N-ethyl-N-phenylaminomethyl)-4-pyrrolidino-5-methoxyaniline.

Example 4

Preparation of 2-N-morpholinomethyl-4-morpholino-5-methoxyaniline.—When 9.6 g. of 2-amino-4-methoxy-5-morpholinobenzoylmorpholine (M.P. 128–131° C.) was reduced as described in Example 1, 6.0 g. of 2-N-morpholinomethyl-4-morpholino - 5 - methoxyaniline (M.P. 111–113° C.) was obtained.

Example 5

Preparation of 2-(N-benzyl-N-isopropylaminomethyl) - 4-piperidino-5-methoxybenzenediazonium chloride.—Reduction of 14 g. of N-isopropyl-N-(2-amino-4-methoxy-5-piperidinobenzoyl)benzylamine as described in the preceding examples gave 10 g. of 2-(N-benzyl-N-isopropylaminomethyl)-4-piperidino-5-methoxyaniline.

Example 6

Preparation of 2-(N-ethyl-N-phenylaminomethyl)-4-N-azabicyclononyl-5 - chloroaniline.—Twelve grams of N-ethyl-n-(2-amino-4-chloro-5-N - azabicyclononylbenzoyl) aniline (M.P. 80–82° C.) was converted as described above to 2-(N-ethyl-N-phenylaminomethyl)-4-N - azabicyclononyl-5-chloroaniline (M.P. 102–109° C.). The preparation followed the method set forth in Example 1 with the exception that 0.5 mole of 2-nitro-4,5-dichlorobenzoic acid was the starting material instead of 2-nitro-5-chlorobenzoic acid. Instead of morpholine, azabicyclononane (1 liter) was added to N-ethyl-N-(2-nitro-4,5-dichlorobenzoyl)aniline.

Examples 7–21

The preparation of other compounds of this invention may be accomplished by substituting various other reactants in the general preparation as set forth in Example 1.

The following table lists additional compounds produced by following the general preparation method set forth above with the exception that the appropriate reactants are to be selected in order to yield the corresponding substituent on the general formulas shown hereinabove.

| Ex. | A | B | $R_1$ | $R_2$ | $-N\begin{smallmatrix}C-\\C-\end{smallmatrix}$ | |
|---|---|---|---|---|---|---|
| 7 | $CH_3O-$ | -N⟨pyrrolidine⟩ | iso-$C_4H_9$ | iso-$C_4H_9$ | | 2-(N,N,-diisobutylaminomethyl)-4-hexamethylimino-5-methoxyaniline. |
| 8 | $CH_3O$ | -N⟨morpholine⟩ | | | -N⟨hexamethylimino⟩ | 2-(N-azabicyclononyl-methyl)-4-morpholino-5-methoxyaniline. |
| 9 | $CH_3O$ | -N⟨hexamethylimino⟩ | | | -N⟨piperidine⟩ | 2-(N-hexamethyliminomethyl)-4-piperidino-5-methoxyaniline. |
| 10 | $CH_3O$ | -N⟨piperidine⟩ | | | -N⟨pyrrolidine⟩ | 2-(N-piperidinomethyl)-4-pyrrolidino-5-methoxyaniline. |
| 11 | $CH_3O$ | Same as above | | | -N⟨pyrrolidine⟩ | 2-(N-pyrrolidinomethyl)-4-pyrrolidino-5-methoxyaniline. |
| 12 | $CH_3O$ | do | | | -N⟨(4-methylpiperidino)⟩-$CH_3$ | 2-[N-(4-methylpiperidino)methyl]-4-pyrrolidino-5-methoxyaniline. |
| 13 | $CH_3O$ | -N⟨hexamethylimino⟩ | $-C_6H_{11}$ | $-C_6H_{11}$ | | 2-(N,N-dicyclohexylaminomethyl)-4-hexamethylimino-5-methoxyaniline. |
| 14 | $CH_3O$ | -N⟨pyrrolidine⟩ | $-C_6H_5$ | $-C_6H_5$ | | 2-(N,N-diphenylaminomethyl)-4-pyrrolidino-5-methoxyaniline. |

| Ex. | A | B | $R_1$ | $R_2$ | $-N\begin{smallmatrix}C-\\C-\end{smallmatrix}$ | |
|---|---|---|---|---|---|---|
| 15 | $C_6H_5OC_2H_4O$ | $-N\!\!<\!\!\bigcirc\!\!>\!\!O$ (morpholino) | — | — | $-N\!\!<\!\!\bigcirc\!\!>\!\!O$ | 2-(N-morpholinomethyl)-4-morpholino-5-phenoxyethoxyaniline. |
| 16 | Cℓ | $-N\!\!<\!\!\bigcirc$ (piperidino) | $-CH_3$ | $-CH_2C_6H_5$ | — | 2-(N-benzyl-N-methylaminomethyl)-4-piperidino-5-chloroaniline. |
| 17 | HO | $-N\!\!<\!\!\bigcirc\!\!>\!\!O$ | $-C_2H_5$ | $-C_6H_5$ | — | 2-(N-ethyl-N-phenylaminomethyl)-4-morpholino-5-hydroxyaniline. |
| 18 | $C_2H_5OC_2H_4O$ | Same as above | — | — | $-N\!\!<\!\!\bigcirc$ (pyrrolidino) | 2-(N-pyrrolidinomethyl)-4-morpholino-5-ethoxyethoxyaniline. |
| 19 | $C_4H_9O$ | do | — | — | $-N\!\!<\!\!\bigcirc$ (hexamethyleneimino) | 2-(N-hexamethyleneiminomethyl)-4-morpholino-5-butoxyaniline. |
| 20 | H | $-N\!\!<\!\!\bigcirc$ (azabicyclononyl) | $-CH\!<\!\!\begin{smallmatrix}CH_3\\CH_3\end{smallmatrix}$ | $-C_6H_{11}$ | — | 2-(N-cyclohexyl-N-isopropylaminomethyl)-4-azabicyclononylaniline. |
| 21 | $CH_3O$ | $-N\!<\!\!\begin{smallmatrix}CH_3\\CH_3\end{smallmatrix}$ | $-CH_3$ | $-CH_3$ | — | 2-(N,N-dimethylaminomethyl)-4-dimethylamino-5-methoxyaniline. |

Examples 22–41

Preparation of the diazonium metal salt complex from each of the substituted ortho-amino-p-phenylenediamines is carried out as follows:

Fifty grams of the compound obtained from each of the Examples 1–20 was dissolved in water (75 ml.) and concentrated hydrochloric acid (75 ml.) and the solutioned cooled to 0° C. A 5 N solution of sodium nitrate was slowly added while maintaining the mixture at 0°–10° C. until the response to Green's reagent gave a persistent positive result. To the cold solution was added 50% $ZnCl_2$ solution precipitating the solid diazo complex which was filtered off, washed and dried.

Other metal halides, such as tin and cadmium chlorides and bromides can be used instead of zinc chloride.

The diazonium cation may also be stabilized with reaction with mineral acid to form the diazonium sulfates and fluoroborates.

The following is a list of the diazonium salts corresponding to Examples 22–41:

2-(N-ethyl-N-phenylaminomethyl)-4-morpholinobenzene diazonium chloride
2-(N,N-di-sec.-butylaminomethyl)-4-morpholino-5-methoxybenzene diazonium chloride
2-(N-ethyl-N-phenylaminomethyl)-4-pyrrolidino-5-methoxybenzene diazonium chloride
2-(N-morpholinomethyl)-4-morpholino-5-methoxybenzene diazonium chloride
2-(N-benzyl-N-isopropylaminomethyl)-4-piperidine-5-methoxybenzene diazonium chloride
2-(N-ethyl-N-phenylaminomethyl)-4-N-azabicyclononyl-5-chlorobenzene
2-(N,N-di-iso-butylaminomethyl)-4-hexamethylimino-5-methoxybenzene diazonium chloride
2-(N-azabicyclononylmethyl)-4-morpholino-5-methoxybenzene diazonium chloride
2-(N-hexamethyliminomethyl)-4-piperidino-5-methoxybenzene diazonium chloride
2-(N-piperidinomethyl)-4-pyrrolidino-5-methoxybenzene diazonium salt
2-(N-pyrrolidinomethyl)-4-pyrrolidino-5-methoxybenzene diazonium fluoroborate
2-[N-(4-methylpiperidino)-methyl]-4-pyrrolidino-5-methoxybenzene diazonium tin chloride
2-(N,N-dicyclohexylaminomethyl)-4-hexamethylimino-5-methoxybenzene diazonium chloride
2-(N,N-diphenylaminomethyl)-4-pyrrolidino-5-methoxybenzene diazonium fluoroborate
2-(N-morpholinomethyl)-4-morpholino-5-phenoxyethoxy benzene diazonium chloride
2-(N-benzyl-N-methylaminomethyl)-4-piperidino-5-chlorobenzene diazonium chloride
2-(N-ethyl-N-phenylaminomethyl)-4-morpholino-5-hydroxybenzene diazonium salt
2-(N-pyrrolidinomethyl)-4-morpholino-5-ethoxyethoxy benzene diazonium chloride
2-(N-hexamethyleneiminomethyl)-4-morpholino-5-butoxybenzene diazonium chloride
2-(N-cyclohexyl-N-isopropylaminomethyl)-4-azabicyclononyl benzene diazonium chloride Example 42

The compound prepared in Example 21 from the amine of Example 1 was used to sensitize a base material, such as paper, by applying the following sensitizing solution:

| | |
|---|---|
| Water _____milliliters__ | 1000 |
| 2-(N-ethyl-N-phenylaminomethyl) - 4 - morpholino benzene diazonium chloride $ZnCl_2$ complex grams__ | 20 |
| Sodium 2,3-dihydroxynaphthalene-6-sulfonate grams__ | 30 |
| Thiourea _____do____ | 50 |
| Citric acid _____do____ | 15.0 |
| Zinc chloride _____do____ | 60.0 |

The above solution was coated at the rate of 18 grams per square yard to produce a two-component diazotype paper developable in an alkaline medium (such as exposure to ammonia gas) enabling the azo-dye coupling reaction to proceed between the diazonium salt and the coupler, sodium 2,3-dihydroxynaphthalene-6-sulfonate. A dense blue azo-dye image was produced upon exposure to a tungsten incandescent light source emitting primarily radiation in the visible portion of the spectrum.

What is claimed is:

1. A light sensitive diazotype material comprising a base support having applied thereon a light responsive coating including a diazonium compound having one of the following formulas:

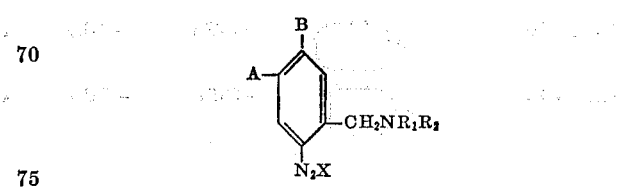

and

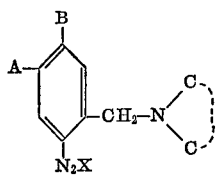

in which X is an anion of an acid; wherein A is hydrogen, alkoxyl containing 1 to 4 carbon atoms, hydroxyl, chlorine or alkoxyalkoxyl containing 2 to 8 carbon atoms; B is morpholino, hexamethyleneimino, 3-azabicyclo-(3.2.2)nonyl, pyrrolidino, piperidino or dialkylamino containing 2 to 8 carbon atoms, $R_1$ is alkyl containing 1 to 4 carbon atoms, phenyl, cyclohexyl or benzyl, and $R_2$ is alkyl containing 1 to 4 carbon atoms, phenyl, cyclohexyl or benzyl, the sum of the carbon atoms in $R_1$ and $R_2$ being from 2 to 14 inclusive, and

is a saturated cyclic amine residue selected from the group consisting of pyrrolidine, alkyl-substituted pyrrolidine, piperidine, hexamethyleneimine, - 3 - azabicyclo (3.2.2) nonane, piperazine and morpholine.

2. The member as claimed in claim 1 wherein the diazonium chloride is 2-(N-ethyl-N-phenylaminomethyl)-4-morpholinobenzene diazonium salt.

3. The member as claimed in claim 1 wherein the diazonium chloride is 2-(N,N-di-sec-butylaminomethyl)-4-morpholino-5-methoxy benzene diazonium salt.

4. The member as claimed in claim 1 wherein the diazonium chloride is 2-(N-morpholinomethyl)-4-morpholino-5-methoxybenzene diazonium salt.

5. The member as claimed in claim 1 wherein the diazonium chloride is 2-(N-benzyl-N-isopropylaminomethyl)-4-piperidino-5-methoxybenzene diazonium salt.

6. The member as claimed in claim 1 wherein the diazonium chloride is 2-(N-ethyl-N-phenylaminomethyl)-4-N-azabicyclononyl-5-chlorobenzene diazonium salt.

7. The member as claimed in claim 1 wherein the diazonium chloride is 2-(N-ethyl-N-phenylaminomethyl)-4-pyrrolidine-5-methoxybenzene diazonium salt.

References Cited

UNITED STATES PATENTS

| | | | |
|---|---|---|---|
| 2,980,534 | 4/1961 | Printy et al. | 96—91 R |
| 3,407,066 | 10/1968 | Mustacchi et al. | 96—91 R |
| 3,463,639 | 8/1969 | Baltazzi | 96—49 X |
| 2,680,074 | 6/1954 | Sus | 96—91 R |
| 2,946,684 | 7/1960 | Sus et al. | 96—91 R |
| 3,462,271 | 8/1969 | Ronhut et al. | 96—91 R |
| 2,437,868 | 3/1948 | Von Glahn et al. | 96—91 R |
| 3,139,341 | 6/1964 | Schlesinger | 96—91 R |

FOREIGN PATENTS

| | | | |
|---|---|---|---|
| 864,011 | 3/1961 | Great Britain | 96—91 R |
| 538,869 | 8/1941 | Great Britain | 96—91 R |
| 646,444 | 11/1950 | Great Britain | 96—91 R |
| 636,891 | 5/1950 | Great Britain | 96—91 R |

OTHER REFERENCES

Dinaburg, M. S.: "Photosensitive Diazo Cpds.," The Focal Press, 1964, p. 60 relied on.

Noller, C. S.: "Textbook of Organic Chemistry, 2nd ed., 1958, W. B. Saunders Co., pp. 339–344 relied on.

Kosar, J.: "Light-Sensitive Systems," J. Wiley & Sons, pp. 224–229 relied on.

CHARLES L. BOWERS, Jr., Primary Examiner

U.S. Cl. X.R.

260—141; 96—49